US010910755B2

(12) United States Patent
Gibbon

(10) Patent No.: US 10,910,755 B2
(45) Date of Patent: Feb. 2, 2021

(54) CONNECTOR STORAGE DEVICE

(71) Applicant: Thomas Gibbon, Harveys Lake, PA (US)

(72) Inventor: Thomas Gibbon, Harveys Lake, PA (US)

( * ) Notice: Subject to any disclaimer, the term of this patent is extended or adjusted under 35 U.S.C. 154(b) by 0 days.

(21) Appl. No.: 15/936,982

(22) Filed: Mar. 27, 2018

(65) Prior Publication Data

US 2019/0305463 A1 Oct. 3, 2019

(51) Int. Cl.

| | |
|---|---|
| ***H02G 3/14*** | (2006.01) |
| ***H01R 13/44*** | (2006.01) |
| ***H01R 13/74*** | (2006.01) |
| ***H01H 9/02*** | (2006.01) |
| ***H01R 13/70*** | (2006.01) |
| ***H01R 25/00*** | (2006.01) |
| ***H01R 13/443*** | (2006.01) |
| *H01R 13/72* | (2006.01) |
| *H01R 103/00* | (2006.01) |

(52) U.S. Cl.

CPC ........... *H01R 13/44* (2013.01); *H01H 9/0271* (2013.01); *H01R 13/443* (2013.01); *H01R 13/701* (2013.01); *H01R 13/748* (2013.01); *H01R 25/006* (2013.01); *H01R 13/72* (2013.01); *H01R 2103/00* (2013.01)

(58) Field of Classification Search

CPC .... H01R 13/44; H01R 13/701; H01R 13/748; H01R 13/72; H01R 13/46; H01R 13/443; H01R 2103/00; H01R 25/006; H01H 9/0271; H02G 3/14; H02G 3/083

USPC ................. 174/53, 55, 58, 135, 66, 67, 520; 220/241, 242; 439/536, 373, 501; 242/388, 388.6, 406

See application file for complete search history.

(56) References Cited

U.S. PATENT DOCUMENTS

| | | | | |
|---|---|---|---|---|
| 2,438,143 | A * | 3/1948 | Brown | H01R 13/72 174/66 |
| 3,689,868 | A * | 9/1972 | Snyder | H01R 13/72 174/66 |
| 4,293,173 | A * | 10/1981 | Tricca | H01R 13/443 174/67 |
| 4,702,709 | A | 10/1987 | Santilli | |
| 4,921,444 | A | 5/1990 | Cama | |
| 6,130,384 | A | 10/2000 | Esteves et al. | |
| 6,969,803 | B1 | 11/2005 | Friedberg | |
| 7,067,737 | B2 | 6/2006 | Mallen | |

(Continued)

FOREIGN PATENT DOCUMENTS

JP H05144501 A 6/1993

OTHER PUBLICATIONS

International Search Report for PCT/US2019023991 dated Jun. 6, 2019.

*Primary Examiner* — Angel R Estrada

(74) *Attorney, Agent, or Firm* — Brown & Michaels, PC

(57) ABSTRACT

A connector storage device includes a housing and a nonconductive connector on an exterior of the housing. The nonconductive connector is configured to connect with a first conductive connector. In another embodiment, a connector storage device includes a cover plate for a wall outlet or a switch, and at least one connector mounted on the cover plate. The cover plate defines at least one opening configured to permit insertion of an electrical outlet or an electrical switch, and the at least one connector is configured to connect with an electrical connector.

25 Claims, 4 Drawing Sheets

(56) References Cited

U.S. PATENT DOCUMENTS

| | | | | |
|---|---|---|---|---|
| 7,255,588 | B2 | 8/2007 | Wilder | |
| 7,309,834 | B1 * | 12/2007 | Byrd | B65H 75/425 174/135 |
| 7,528,323 | B2 * | 5/2009 | Wu | H01R 13/72 174/66 |
| 7,683,257 | B1 | 3/2010 | Shotey et al. | |
| 8,415,920 | B2 * | 4/2013 | Liao | H02J 7/0042 16/225 |
| 9,088,081 | B2 * | 7/2015 | Hildebrandt | H01R 13/00 |
| 9,653,898 | B1 | 5/2017 | Deaton et al. | |
| 9,742,094 | B1 | 8/2017 | Grunberger et al. | |
| 2005/0145534 | A1 | 7/2005 | Steeber | |
| 2011/0303433 | A1 | 12/2011 | Wagner | |
| 2014/0113468 | A1 | 4/2014 | McBane | |
| 2016/0294127 | A1 | 10/2016 | Mouradian et al. | |

* cited by examiner

CONNECTOR STORAGE DEVICE

BACKGROUND OF THE INVENTION

The invention pertains to the field of connector storage. More particularly, the invention pertains to connector storage devices for storing signal-conductive connectors.

Along with the great variety and number of electronic devices in the marketplace, there are a great variety and number of connectors and cords used to connect these devices and/or exchange signals to or from the devices. For example, some connectors include electrical connectors to conduct electrical signals to power or recharge the devices, audio and video input and output connectors to conduct audio and video signals, cat5 cable connectors to conduct Ethernet signals, Universal Serial Bus (USB) connectors to conduct data signals, etc. Many types of connectors have further variety and/or cross-function as other types as well. For example, universal serial bus (USB) connectors, type-C USB connectors, and high-definition multimedia interface (HDMI) connectors, amongst others, can conduct signals to convey a variety of information for differing functions. Electrical signals to power devices, for example, can be conducted through standard power plugs, but also through USB connectors, type-C USB connectors, or other connectors.

Many of these connectors, and their corresponding cords or cables, are portable, especially with the widespread use of mobile electronic devices. For example, portable smart phones, tablet computer, laptop computers, gaming devices, and audio devices that can be powered by rechargeable battery typically have a detachable, portable power cord and connector, and often have other portable cables or cords with connectors through which the devices can communicate with other electronic devices. The power cord and corresponding connector sometimes doubly function to exchange information signals between multiple electronic devices.

The cords and their corresponding connectors can be disorganized and tangled. Wire ties or rubber bands are sometimes used to retain an organized loop of cord, but these can break easily, especially during repeated use. Also, they are not always readily available to use.

Detachable, portable cords and/or connectors are easily misplaced. Detachable cords and/or connectors that are functional with a small portable electronic device are not typically kept connected to that device, and instead are left lying around, for example, near where they were last used, which is easily forgotten and often difficult to locate.

SUMMARY OF THE INVENTION

In one embodiment, a connector storage device includes a housing and a nonconductive connector on an exterior of the housing. The nonconductive connector is configured to connect with a first conductive connector.

In another embodiment, a connector storage device includes a cover plate for a wall outlet or a switch, and at least one connector mounted on the cover plate. The cover plate defines at least one opening configured to permit insertion of an electrical outlet or an electrical switch, and the at least one connector is configured to connect with an electrical connector.

DETAILED DESCRIPTION OF THE INVENTION

Figure 1:
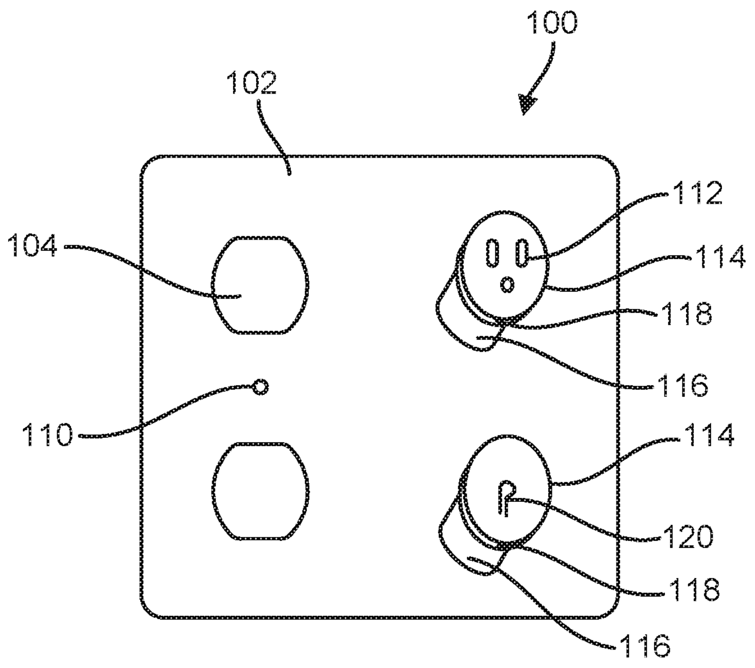
FIG. 1 shows an isometric view of a storage device to store a connector, according to an embodiment of the invention.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A connector storage device is disclosed to provide a convenient and consistent location, and an organized way, to store a connector and/or cord used with electronic devices.

Figure 2:
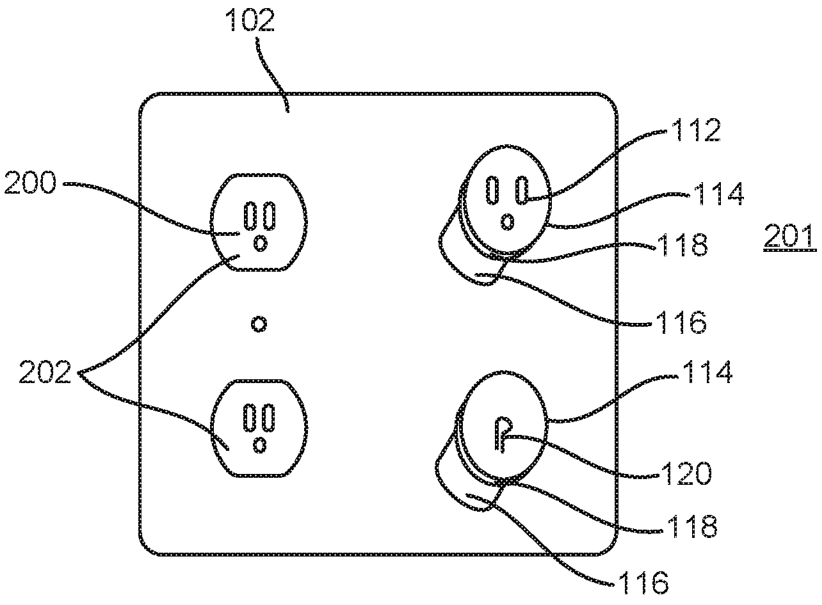
FIG. 2 shows the storage device of FIG. 1 mounted around an electrical receptacle.

FIGS. 1 and 2 illustrate a storage device 100 to store a connector (not shown), according to an example embodiment of the invention. The storage device 100 includes a cover plate 102 for a signal-conductive connector 200. FIG. 2 illustrates the storage device 100 mounted around the signal-conductive connector 200. The cover plate 102 can cover exposed conductive surfaces to protect from electrical shock, and can also add a finished aesthetic to an otherwise unfinished looking mounting area at the joint between a wall or other surface 201 and the signal-conductive connector 200. Referring to FIG. 1, the cover plate 102, accordingly, defines an opening 104 configured to permit snug (or otherwise) insertion of the signal-conductive connector 200.

In the case of FIGS. 1 and 2, the signal-conductive connector 200 is a wall outlet, and the openings 104 each fit around a socket 202 of the wall outlet. The cover plate 102, however, can be adapted to function as a cover plate for any wall-mounted or surface-mounted, signal-conductive connector, or other signal-conductive connector with which a cover plate 102 can be used. For example, the opening 104 can be sized and shaped to fit a coaxial cable connector, an HDMI connector, a USB connector, a type-C USB connector, a fiber optic cable connector, a cat5 cable connector, or any other now-known or future-developed signal-conductive connector. A storage device 300 can also include a cover plate 302 with an opening 304 suited to fit a signal control device or other type of signal circuit device, such as a switch 306, as shown in FIG. 3 and FIG. 4, to open or close a signal path of a circuit.

Figure 3:
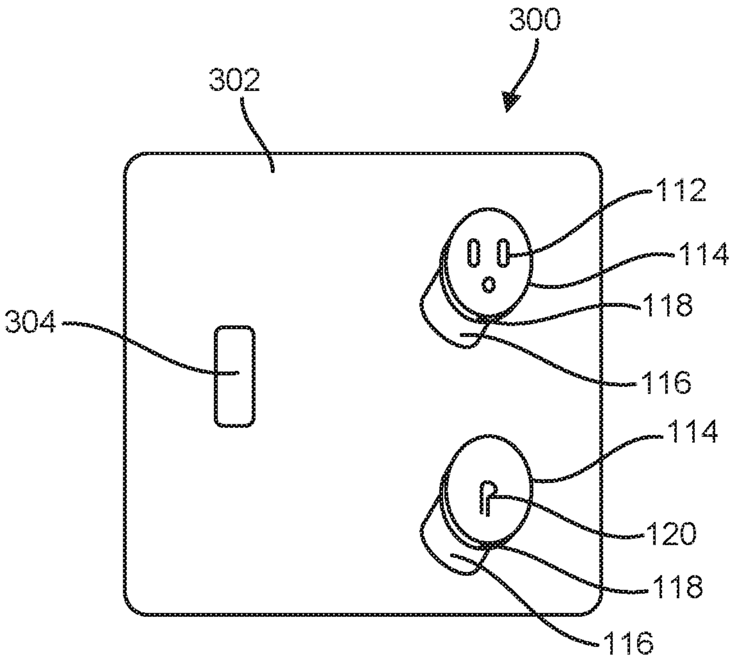
FIG. 3 shows an isometric view of a storage device to store a connector, according to an embodiment of the invention.
Figure 4:
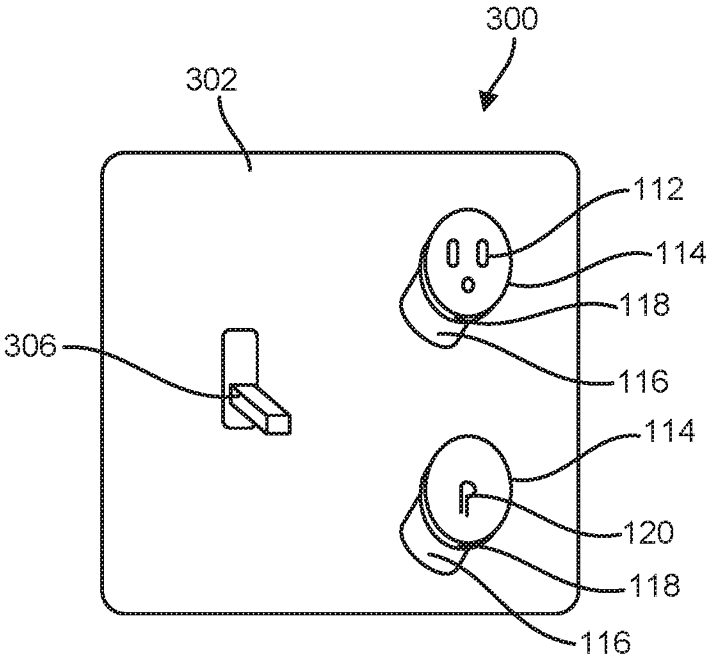
FIG. 4 shows the storage device of FIG. 3 mounted around an electrical switch.

While FIGS. 1 and 2 each show only one wall outlet 200 (with two sockets 202) and FIGS. 3 and 4 each show only one light switch 304, each cover plate 102, 302 can have multiple openings 104, 304 for multiple signal-conductive connectors 200 or signal circuit devices 306. For example, the cover plate 102 can have one or more wall outlet openings 104 and one or more light switch openings 304.

Referring to FIGS. 1-4, the cover plate 102, 302 can have a mounting opening 110 to fasten the cover plate 102, 302 to a wall, a surface, a signal-conductive connector, or another type of signal circuit device. The mounting opening can accept a screw that threads into an internally threaded hole in the wall outlet 200 or in the signal circuit device 306. The cover plate 102, 302 can alternatively utilize other now-known or future-developed mounting elements.

The cover plate 102, 302 includes a nonconductive connector 112 mounted directly or indirectly on the cover plate 102, 302. The connector 112 can be configured to connect with any now-known or future-developed signal-conductive connector, including but not limited to, a male electrical plug, a female electrical receptacle, an HDMI cable connector, a USB connector, a type-C connector, a coaxial cable connector, a fiber optic cable connector, a cat5 cable, a headphone jack, and a microphone jack. The connector 112 can mate with the signal-conductive connector to removably retain and store the signal-conductive connector between uses. Because the cover plate 102, 302 can be mounted to a stationary, identifiable, and memorable location (e.g., a wall outlet, light switch, etc.), the stored signal-conductive connector can be easily found. Further, because the cover plate 102, 302 can be mounted around a signal conductive connector that mates to the stored signal-conductive connector, the stored signal-conductive connector can be conveniently retrieved for use at that location. Furthermore, storing the stored signal conductive connector in a nonconductive connector near or adjacent a signal-conductive connector rather than in the signal-conductive connector can reduce consumption and waste of signal (and associated monetary expense), can protect devices connectable through the stored conductive connector from power surge, and can free the conductive connector for use by other plugs.

The connector 112 is nonconductive, so that a signal-conductive connector connected to the connector 112 will not conduct a signal from a connected connector through the connector 112 to any connected device. The nonconductive nature can be accomplished by using a signal-nonconductive material for the connector 112, by terminating the signal path at the connector 112, by insulating the connector 112, or by insulating all contact points configured to contact the signal-conductive connector. What material is nonconductive depends on the type of signal intended to be conducted. For example, a metal might be nonconductive to a fiber optic signal, and conductive to an electrical signal. The converse might be true of glass (e.g., glass might be conductive to a fiber optic signal, and nonconductive to an electrical signal). The connector 112 conceivably could be made from any material, and from multiple materials, some of which can be conductive, as long as a specified signal cannot be conducted from a connected conductive connector through the nonconductive connector 112 to another device contacting the nonconductive connector 112.

The connector 112 also can be shaped externally to act as a spool 114, upon which a cord or cable, independent or attached to the connector 112, can be wound. The cord or cable can be wound around the single spool 114, or around a group of multiple spools 114. Each spool 114 can have a cylindrical body portion 116 between the cover plate 102, 302 and a top flange 118. The top flange 118 can have a significantly larger diameter than the cylindrical portion 116, to retain the cord or cable between the cover plate 102, 302 and the top flange 118. Further, a retainer member 120 can be mounted on the spool 114 (e.g., on the top flange 118) or the cover plate 102, 302 to retain the end of the cable or cord after it has been wound, to limit the cable or cord from unwinding. The retainer member 120 can be a clip, a hook, a spring, a latch, a clamp, or another now-known or future-developed structure to hold a portion of cable or cord. Locating the retainer member 120 on near the spool 114 provides for a more compact winding of the cord or cable.

FIGS. 1-4 each show only one connector 112, though the cover plate 102, 302 can be equipped with multiple connectors 112. Further, the additional connectors 112 can vary in type.

Figure 5:
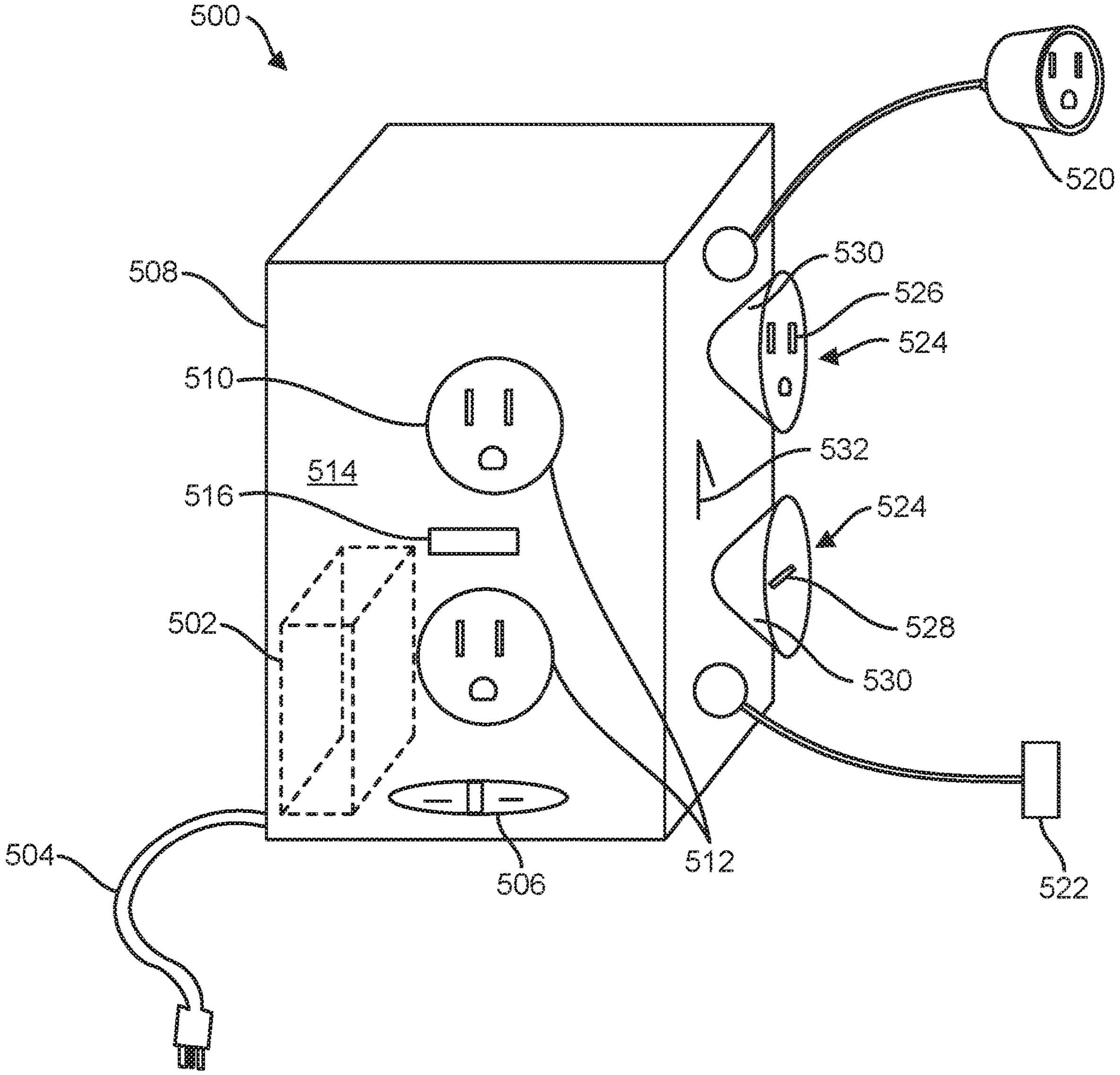
FIG. 5 shows a storage device to store a connector, according to an embodiment of the invention.

FIG. 5 illustrates a storage device 500 to store a connector. The storage device 500 can be a stand-alone device with a dedicated power source 502, or a power source dependent device configured to connect to an external power source, such as with an AC power plug and cord 504. In either case, the storage device 500 can include a power switch 506 to enable or disable power to the storage device 500. Further, the storage device 500 can include a housing 508 to support the other components.

The other components of the storage device 500 can be much like those of the storage device 100, though supported instead by the housing 508 rather than the cover plate 102. A signal-conductive connector, such as a wall outlet 510 with sockets 512, can be supported by the housing 508, generally aligned with a face 514 of the housing 508, and/or extending through the face 514. The housing 508 can support a great variety of wall-mounted or surface-mounted, signal-conductive connectors, or other signal-conductive connectors. Some example signal-conductive connectors include a coaxial cable connector, an HDMI connector, a USB connector, a type-C USB connector, a fiber optic cable connector, a cat5 cable connector, or any other now-known or future-developed signal-conductive connector. The housing 508 can also support a signal control device or other type of signal circuit device, such as power switch 506. Multiple signal-conductive connectors can be supported by the housing 508. In FIG. 5, in addition to the wall outlet 510 shown mounted in the face 514 of the housing 508, a USB connector 516 is shown mounted in the face 514 of the housing 508. Further, a retractable electrical socket 520, and a retractable USB connector 522 are shown.

The housing 508 can also include a connector 524 mounted directly or indirectly on the housing 508. The connector 524 can be configured to connect with any now-known or future-developed signal-conductive connector, including but not limited to, a male electrical plug, a female electrical receptacle, an HDMI cable connector, a USB connector, a type-C connector, a coaxial cable connector, a fiber optic cable connector, a cat5 cable, a headphone jack, and a microphone jack. In FIG. 5, two connectors 524 are shown—one shaped like an electrical receptacle 526 and one shaped like a USB connector 528. Each connector 524 can mate with the signal-conductive connector to removably retain and store the signal-conductive connector between uses. Because the housing 508 can be mounted to a stationary, identifiable, and memorable location (e.g., a wall outlet, light switch, etc.) or stored less temporarily than a cord or cable in a memorable location, the stored signal-conductive connector can be easily found. Further, because the housing 508 includes signal conducting connectors that mate to the stored signal-conductive connector, and the housing 508 can supply the type of signal conducted by the stored signal-conductive connector, the stored signal-conductive connector can be conveniently retrieved for use at the connector storage device 500. Furthermore, storing the stored signal-conductive connector in a non-conductive connector near or adjacent a signal-conductive connector rather than in the signal-conductive connector can reduce consumption and waste of signal, can protect devices connected through the connector from power surge, and can free the signal-conductive connector for use by other plugs.

The connectors 524 are nonconductive, so that a signal-conductive connector connected to the connectors 524 will not conduct a signal from a connected connector through the connector 524 to any connected device. The nonconductive nature can be accomplished by using a signal-nonconductive material for the connectors 524, by terminating the signal path at the connectors 524, by insulating the connectors 524, or by insulating all contact points configured to contact the signal-conductive connector. What material is nonconductive depends on the type of signal intended to be conducted. For example, a metal might be non-conductive to a fiber optic signal, and conductive to an electrical signal. The converse might be true of glass (e.g., glass might be conductive to a fiber optic signal, and non-conductive to an electrical signal). Each connector 524 conceivably could be made from any material, and from multiple materials, some of which can be conductive, as long as a specified signal cannot be conducted from a connected conductive connector through the nonconductive connector 524 to another device contacting the nonconductive connector 524.

The connectors 524 also can each be shaped externally to act as a spool 530, upon which a cord or cable, independent or attached to the connectors 524, can be wound. The cord or cable can be wound around the single spool 530, or around a group of multiple spools 530. Each spool 530 can be shaped as described with respect to FIGS. 1-4. FIG. 5 illustrates an alternative embodiment, wherein the spools 530 are generally conical in shape, to retain the cord or cable on the spool 530. Further, a retainer member 532 can be mounted on the spool 530 or the housing 508 to retain the end of the cable or cord after it has been wound, to limit the cable or cord from unwinding. The retainer member 532 can be a clip, a hook, a spring, a latch, a clamp, or another now-known or future-developed structure to hold a portion of cable or cord. Locating the retainer member 532 on near the spool 530 can provide for a more compact winding of the cord or cable.

Figure 6:
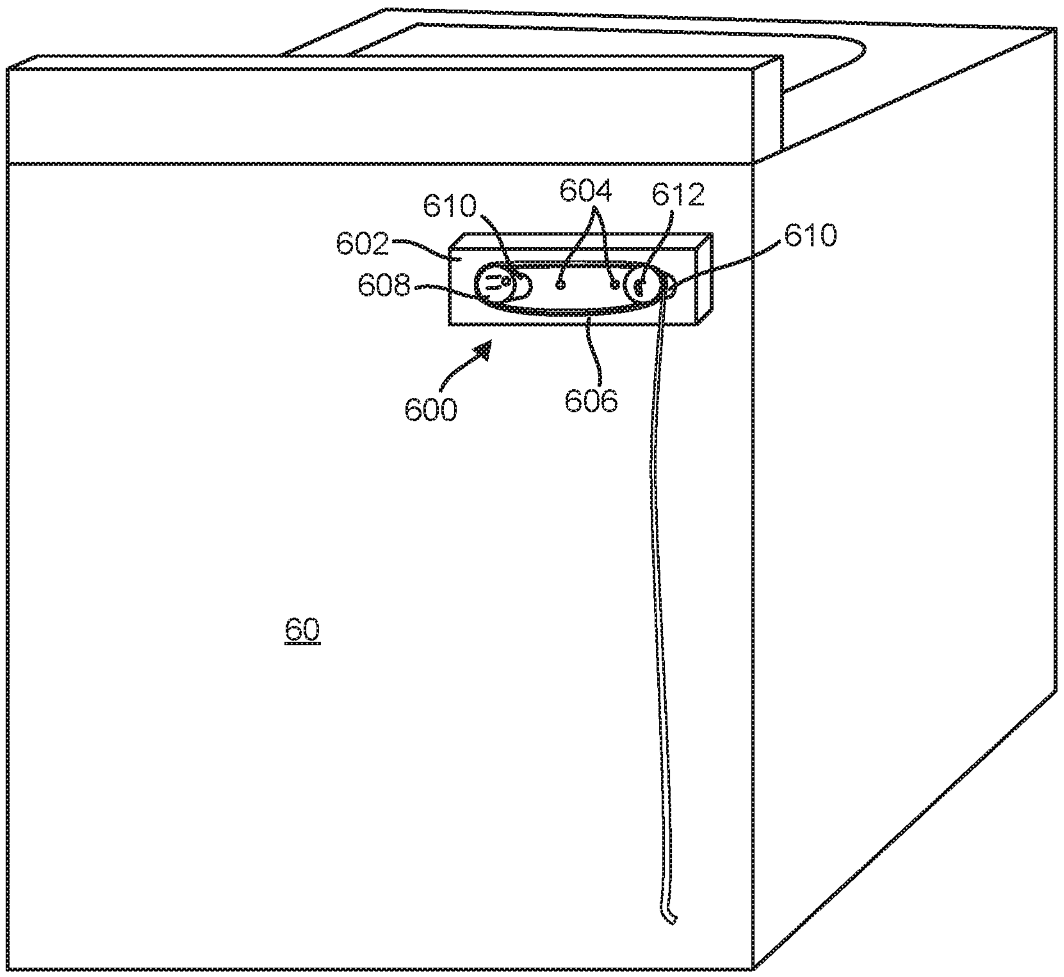
FIG. 6 shows a storage device to store a connector, according to another embodiment of the invention.

FIG. 6 illustrates a storage device 600 according to an embodiment configured to attach the device 600 to an appliance 60 (e.g., clothes washing machine, clothes dryer, refrigerator, toaster oven, etc.) or other item or electrical device with a power cord or power cable. The device includes a housing 602, which can be configured variously to function with various items with a cord or cable. A plate of relative thinness, as illustrated in FIG. 6, has the advantage of having relatively low weight and size, and a flat surface area to match and mate with a surface of the appliance or other item with a cord or cable. A fastening element 604 can be used to attach the housing 602 to the appliance 60 or other item. In FIG. 6, two openings 604 are illustrated, which can accept screws, nails, bolts, tacks, or another similar fastener. Any now-known or future-developed fastener can conceivably be used alternatively, such as, but not limited to, magnets, a magnetic layer, suction elements, or an adhesive on the back side of the housing 602 (opposite a front side 606). On a side of the housing 602 not the back side can be mounted a nonconductive connector 608, a spool 610, and a cord retainer 612. The nonconductive connector 608, the spool 610, and the cord retainer 612 can be as described above with reference to the storage device 500 or the storage device 100.

In another version of this embodiment, the housing 602 can include the appliance 60 (e.g., clothes washing machine, clothes dryer, refrigerator, toaster oven, etc.) or other item or electrical device with a power cord or power cable, such that the nonconductive connector 608 and the spool 610 are mounted directly to the appliance 60 or other item or electrical device with a power cord or power cable. The cord retainer 612 can still be mounted to the spool 610, or directly to the housing 602.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A storage device to store a connector, the storage device comprising:

a cover plate for a wall outlet or a switch, the cover plate having a front surface and a back surface, and defining at least one opening extending from the front surface to the back surface, the at least one opening configured to permit insertion of an electrical outlet or an electrical switch; and an electrically nonconductive connector mounted and supported on the front surface of the cover plate and spaced a distance along the front surface of the cover plate from the at least one opening such that the electrically nonconductive connector avoids intersecting with a center axis of the at least one opening, the electrically nonconductive connector configured to directly connect with an electrical connector, wherein the electrically nonconductive connector includes an end farthest from the cover plate and a spool to accommodate winding of an electrical cord, the spool being between the cover plate and the end, the spool having a smaller outer diameter than an outer diameter of the end.

2. The storage device of claim 1, wherein the electrically nonconductive connector is electrically insulated from an electrical power source.

3. The storage device of claim 1, further comprising at least one from a group consisting of a clip and a hook, to retain the electrical cord, the at least one from the group consisting of the clip and the hook being mounted on the spool.

4. The storage device of claim 1, further comprising at least one from a group consisting of a clip and a hook, to retain an electrical cord, the at least one from the group consisting of the clip and the hook being mounted on the cover plate.

5. The storage device of claim 1, wherein the electrically nonconductive connector is configured to mate with one from the group consisting of a female electrical receptacle, a male electrical plug, a USB connector, and a type-C USB connector.

6. The storage device of claim 1, wherein every connection of the electrical connector with the electrically nonconductive connector is nonconductive.

7. The storage device of claim 1, wherein the electrically nonconductive connector extends from the front surface of the cover plate entirely on a single side of the front surface.

8. The storage device of claim 1, wherein when the electrical connector is connected to the electrically nonconductive connector, an electrical signal conducting along a path from the electrical connector to the electrically nonconductive connector is terminated at the electrically nonconductive connector.

9. The storage device of claim 1, wherein the spool circumscribes at least a portion of the electrically nonconductive connector.

10. The storage device of claim 1, wherein the electrically nonconductive connector is configured such that as a result of assembling the electrical outlet in the at least one opening of the cover plate and connecting the electrical connector to the electrical outlet, the electrical outlet does not connect to the electrically nonconductive connector.

11. The storage device of claim 1, wherein fully mating the electrical connector with the electrically nonconductive connector and supplying an electrical signal to the electrical connector establishes no electrically conductive connection.

12. A storage device to store a connector, the storage device comprising:

a housing having an exterior face; and a nonconductive connector mounted and supported on the exterior face of the housing, the nonconductive connector configured to connect with a first conductive connector, such that fully inserting the first conductive connector into the nonconductive connector and supplying a conducting signal to the first conductive connector establishes no conductive connection, the nonconductive connector having a front surface facing approximately the same direction the exterior face of the housing faces, and has an opening through the front surface to accept conductive pins of the first conductive connector, the nonconductive connector including a spool to accommodate winding of an electrical cord, the spool being between the exterior face of the housing and the front surface of the nonconductive connector, the spool having a smaller outer diameter than an outer diameter of the front surface of the nonconductive connector.

13. The storage device of claim 12, further comprising a second conductive connector, the second conductive connector supported by the housing.

14. The storage device of claim 13, wherein the exterior face of the housing has an opening, and the second conductive connector is positioned in the opening.

15. The storage device of claim 12, wherein the nonconductive connector is electrically insulated from an electrical power source.

16. The storage device of claim 12, further comprising at least one from a group consisting of a clip and a hook, to retain the conductive cord, the at least one from the group consisting of the clip and the hook being mounted on the spool.

17. The storage device of claim 12, wherein the housing includes a first side and a second side, the storage device further comprises a fastening element on the first side to fasten the housing to an electrical appliance, the nonconductive connector is on the second side, and the first side and second side are different sides.

18. The storage device of claim 13, further comprising a third conductive connector from the group consisting of a USB connector, a coaxial cable connector, an HDMI connector, an audio/video connector, a fiber optic connector, a type C USB connector, a headphone jack, and an electrical receptacle, the third conductive connector supported by the housing.

19. The storage device of claim 18, further comprising a power switch to open or close a signal path of a signal supplied to the second conductive connector or the third conductive connector.

20. The storage device of claim 18, wherein the third conductive connector is mounted to the housing by a retractable cord.

21. The storage device of claim 12, wherein the nonconductive connector is configured to resist transmission of an information signal or a power signal.

22. The storage device of claim 12, wherein the housing includes a plate defining at least one opening configured to permit insertion of a second conductive connector.

23. The storage device of claim 12, wherein the housing includes an electrical device having a power cord.

24. The storage device of claim 12, wherein the nonconductive connector extends from the exterior face of the housing entirely on a single side of the exterior face of the housing.

25. The storage device of claim 12, wherein the nonconductive connector is mounted directly on the housing.

* * * * *